(12) United States Patent
Bouhal

(10) Patent No.: US 9,772,633 B2
(45) Date of Patent: Sep. 26, 2017

(54) SYSTEMS AND METHODS FOR CONTROLLING ENERGY INPUT INTO A BUILDING

(71) Applicant: SCHNEIDER ELECTRIC BUILDINGS, LLC, Palatine, IL (US)

(72) Inventor: Abderrahim Bouhal, Roscoe, IL (US)

(73) Assignee: SCHNEIDER ELECTRIC BUILDINGS, LLC, Palatine, IL (US)

( * ) Notice: Subject to any disclaimer, the term of this patent is extended or adjusted under 35 U.S.C. 154(b) by 426 days.

(21) Appl. No.: 14/470,311

(22) Filed: Aug. 27, 2014

(65) Prior Publication Data

US 2016/0062374 A1    Mar. 3, 2016

(51) Int. Cl.
| G05D 23/30 | (2006.01) |
| G05B 15/02 | (2006.01) |
| G05B 11/42 | (2006.01) |
| G06F 17/16 | (2006.01) |

(52) U.S. Cl.
CPC ............ *G05D 23/30* (2013.01); *G05B 11/42* (2013.01); *G05B 15/02* (2013.01); *G06F 17/16* (2013.01)

(58) Field of Classification Search
None
See application file for complete search history.

(56) References Cited

U.S. PATENT DOCUMENTS

| 5,867,384 A | 2/1999 | Drees et al. |
| 6,176,924 B1 * | 1/2001 | Duval .................... C30B 11/00 117/14 |
| 6,453,993 B1 * | 9/2002 | Bujak, Jr. ................ F24F 3/06 165/208 |
| 6,554,198 B1 * | 4/2003 | Hull ....................... F24F 11/006 236/49.3 |

(Continued)

FOREIGN PATENT DOCUMENTS

WO    2010002614 A1    1/2010

OTHER PUBLICATIONS

Qi et al., Multivariable control of indoor air temperature and humidity in a direct expansion (DX) air conditioning (A/C) system, Nov. 4 2008, ELSEVIER, Building and Environment vol. 44, pp. 1659-1667.*

(Continued)

*Primary Examiner* — Jason Lin
(74) *Attorney, Agent, or Firm* — Lando & Anastasi, LLP

(57) ABSTRACT

According to one aspect, a system for controlling each control volume of a plurality of control volumes is provided. The system includes a plurality of sensors corresponding to the plurality of control volumes, and each sensors is configured to detect a temperature value of the control volume corresponding to the sensor, and generate a feedback signal for the control volume corresponding to the sensor based on the temperature value. The system further includes a primary controller configured to receive a set point temperature value for each control volume, receive the feedback signal for each (Continued)

control volume, execute a linear quadratic regulator (LQR) control that is configured to determine a target set point temperature value for each control volume based on the set point temperature value for the control volume and the feedback signal for the control volume, and transmit the target set point temperature value for each control volume.

17 Claims, 13 Drawing Sheets

(56) References Cited

U.S. PATENT DOCUMENTS

| | | | | |
|---|---|---|---|---|
| 7,218,996 | B1* | 5/2007 | Beitelmal | H05K 7/20745 165/80.3 |
| 7,640,760 | B2 | 1/2010 | Bash et al. | |
| 2006/0214014 | A1* | 9/2006 | Bash | F24F 11/0012 236/1 B |
| 2009/0012633 | A1* | 1/2009 | Liu | G06F 1/206 700/90 |
| 2011/0054701 | A1* | 3/2011 | Wang | G05B 15/02 700/278 |
| 2011/0106314 | A1* | 5/2011 | Beitelmal | H05K 7/20836 700/276 |
| 2013/0151019 | A1* | 6/2013 | Federspiel | F24F 11/00 700/276 |
| 2013/0197676 | A1* | 8/2013 | Salsbury | G05B 13/02 700/32 |
| 2014/0365017 | A1* | 12/2014 | Hanna | F24F 11/001 700/276 |
| 2015/0168964 | A1* | 6/2015 | Wu | F24F 11/006 700/276 |
| 2016/0195866 | A1* | 7/2016 | Turney | G05B 23/02 700/291 |

OTHER PUBLICATIONS

Extended European Search Report from corresponding European Application No. 15181208.8 dated Jun. 13, 2016.

* cited by examiner $$\int_0^\infty \underbrace{(x(t)^T \underset{365}{Q} x(t)}_{\substack{\text{comfort, or} \\ \text{desired temperature} \\ 360}} + \underset{380}{u(t)^T} \underset{375}{R} u(t))dt}_{\substack{\text{cost, or} \\ \text{energy utilization} \\ 370}}$$

FIG. 3

$$\frac{dX}{dt} = AX + g(X,U) + d(t)$$

$$X = [T_{w1}, T_{w2}, T_{w3}, T_{w4}, T_{w5}, T_{w6}, T_{w7}, T_{w8}, T_{w9}, T_{w10}, T_1, T_2, T_3]^T$$

$$U = [\dot{m}_1, \dot{m}_2, \dot{m}_3]^T$$

$$g(X,U) = \begin{bmatrix} \frac{c_a}{c_{r1}}(\tau_o - \tau_1) & 0 & 0 & 0 & 0 & 0 & 0 & 0 & 0 & 0 & 0 & 0 & 0 \\ 0 & 0 & 0 & 0 & 0 & 0 & 0 & 0 & \frac{c_a}{c_{r2}}(\tau_o - \tau_2) & 0 & 0 & 0 & 0 \\ 0 & 0 & 0 & 0 & 0 & 0 & 0 & 0 & 0 & \frac{c_a}{c_{r3}}(\tau_o - \tau_3) & 0 & 0 & 0 \end{bmatrix} \begin{bmatrix} \dot{m}_1 \\ \dot{m}_2 \\ \dot{m}_3 \end{bmatrix}$$

$$d(t) = \begin{bmatrix} \frac{\alpha}{C_{w1}} \dot{q}_{rad1} A_1 + \frac{T_\infty}{C_{w1} R_{o1}} \\ \frac{\alpha}{C_{w2}} \dot{q}_{rad2} A_2 + \frac{T_\infty}{C_{w2} R_{o2}} \\ \frac{\alpha}{C_{w3}} \dot{q}_{rad3} A_3 + \frac{T_\infty}{C_{w3} R_{o3}} \\ \frac{\alpha}{C_{w4}} \dot{q}_{rad4} A_4 + \frac{T_\infty}{C_{w4} R_{o4}} \\ \frac{\alpha}{C_{w5}} \dot{q}_{rad5} A_5 + \frac{T_\infty}{C_{w5} R_{o5}} \\ \frac{\alpha}{C_{w6}} \dot{q}_{rad6} A_6 + \frac{T_\infty}{C_{w6} R_{o6}} \\ \frac{\alpha}{C_{w7}} \dot{q}_{rad7} A_7 + \frac{T_\infty}{C_{w7} R_{o7}} \\ 0 \\ 0 \\ 0 \\ \frac{1}{C_{r1}} \dot{q}_{int1} \\ \frac{1}{C_{r2}} \dot{q}_{int2} \\ \frac{1}{C_{r3}} \dot{q}_{int3} \end{bmatrix}$$

$$\frac{dX}{dt} = AX + BU + d(t)$$

$$U = [\dot{m}_1, \dot{m}_2, \dot{m}_3]^T$$

$$B = \begin{bmatrix} \frac{C_p}{C_{r1}}(T_0 - T_{sp,1}) & 0 & 0 \\ 0 & 0 & 0 \\ 0 & 0 & 0 \\ 0 & 0 & 0 \\ 0 & 0 & 0 \\ 0 & 0 & 0 \\ 0 & 0 & 0 \\ 0 & 0 & 0 \\ 0 & 0 & 0 \\ 0 & 0 & 0 \\ 0 & \frac{C_p}{C_{r2}}(T_0 - T_{sp,2}) & 0 \\ 0 & 0 & 0 \\ 0 & 0 & \frac{C_p}{C_{r3}}(T_0 - T_{sp,3}) \end{bmatrix}$$

FIG. 9

Discrete Implementation:

$$u(k) = F(k)b(k+1) - K(k)x(k)$$

Where: $K(k) = [R + B^T P(k+1)B]^{-1} B^T P(k+1)A$
$F(k) = -[R + B^T P(k+1)B]^{-1} B^T$

SYSTEMS AND METHODS FOR CONTROLLING ENERGY INPUT INTO A BUILDING

BACKGROUND

Technical Field

The technical field relates generally to control systems, and more specifically, to systems and methods for improving energy efficiency for a plurality of control volumes using a hierarchical control network.

Background Discussion

A conventional proportional-integral-derivative controller (PID controller) is a type of control loop feedback mechanism that controls a process by monitoring a calculated deviation that represents the difference between a measured process variable and a desired set point. This type of controller attempts to minimize the deviation by adjusting the process control inputs. Although PID controllers are more common than typical on/off controllers and they offer several advantages such as simplicity in design and execution, they may also be largely inefficient in terms of energy usage. This disadvantage is compounded in data centers, where heating and cooling is provisioned for worst-case or peak load scenarios.

SUMMARY

According to various aspects and embodiments, a system for controlling each control volume of a plurality of control volumes is provided. The system includes a plurality of sensors corresponding to the plurality of control volumes. Each sensor of the plurality of sensors is configured to detect a temperature value of the control volume corresponding to the sensor, and generate a feedback signal for the control volume corresponding to the sensor based on the temperature value. The system further includes a primary controller configured to: receive a set point temperature value for each control volume, receive the feedback signal for each control volume, execute a linear quadratic regulator (LQR) control that is configured to determine a target set point temperature value for each control volume based on the set point temperature value for the control volume and the feedback signal for the control volume, and transmit the target set point temperature value for each control volume to a secondary controller of a plurality of secondary controllers.

According to another embodiment, the plurality of secondary controllers correspond to the plurality of control volumes and each secondary controller of the plurality of secondary controllers may be configured to: receive the target set point temperature value for the control volume corresponding to the secondary controller, receive the feedback signal for the control volume corresponding to the secondary controller, and generate a control signal for the control volume corresponding to the secondary controller based on the target set point temperature value for the control volume corresponding to the secondary controller and the feedback signal for the control volume corresponding to the secondary controller. The system further includes at least one actuator configured to adjust a flow rate of air into each control volume based on the control signal of the control volume.

In the system, each secondary controller may be a PID controller. According to at least one embodiment, the control signal for the time index k for each PID controller is defined by:

$$u(k)=F(k)b(k+1)-K(k)x(k)$$

wherein:

$$K(k)=[R+B^TP(k+1)B]^{-1}B^TP(k+1)A;$$

and $$F(k)=-[R+B^TP(k+1)B]^{-1}B^T.$$

In the system, executing the LQR control may include minimizing an LQR function defined by:

$$J=\int_0^\infty (x(t)^TQx(t)+u(t)^TRu(t))dt$$

wherein:

u(t) represents the control signal corresponding to the plurality of secondary controllers;

x(t) represents a state variable corresponding to temperature;

Q represents a weight matrix corresponding to the set point temperature; and

R represents a weight matrix corresponding to energy utilization.

According to some embodiments, the primary controller is further configured to generate a thermal model for the plurality of control volumes. The thermal model may be determined from physical data related to the plurality of control volumes and from at least one calculation based on conservation of energy. The at least one calculation may include at least one heat transfer term corresponding to conduction, convection, and radiation. According to at least one embodiment, the primary controller is further configured to predict an energy utilization for at least one control volume based on the thermal model. In some embodiments, the state variable corresponding to temperature includes at least one temperature derived from the thermal model.

According to another embodiment, executing the LQR control further includes determining a state space model derived from a linear model of the system, the state space model defined by:

$$\frac{dX}{dt}=AX+BU+d(t)$$

wherein:

A represents a state matrix corresponding to temperature;
X represents a vector state corresponding to temperature;
B represents a command matrix; and
U represents a vector input.

According to at least one embodiment, executing the LQR control further includes determining a state space model derived from a non-linear model of the system defined by:

$$\frac{dX}{dt}=AX+g(X,U)+d(t)$$

wherein:

A represents a state matrix corresponding to temperature;
X represents a vector state corresponding to temperature; and
U represents a vector input.

According to various aspects and embodiments, a method of controlling temperature for each control volume of plurality of control volumes in a system is provided. The method includes acts of receiving a measured temperature value corresponding to each control volume of the plurality of control volumes, receiving a set point temperature value for each control volume, determining a target set point temperature value for each control volume by executing a linear quadratic regulator (LQR) control based on the set point temperature value for the control volume and the measured temperature value for the control volume, transmitting the target set point temperature, and generating a control signal for each control volume based on the target set point temperature value for the control volume and the measured temperature value for each control volume.

According to some embodiments, the method further includes adjusting a flow rate of air into each control volume based on the control signal of the control volume.

According to another embodiment, generating the control signal for each control volume is performed by implementing PID control. According to at least one embodiment, the control signal for the time index k for implementing the PID control is defined by:

$$u(k)=F(k)b(k+1)-K(k)x(k)$$

wherein:

$$K(k)=[R+B^TP(k+1)B]^{-1}B^TP(k+1)A;$$

and $$F(k)=-[R+B^TP(k+1)B]^{-1}B^T.$$

According to certain embodiment, the method further includes generating a thermal model for the plurality of control volumes based on physical data related to the plurality of control volumes and from at least one calculation based on conservation of energy, wherein the at least one calculation includes at least one heat transfer term corresponding to conduction, convection, and radiation. According to some embodiments, the method further includes predicting an energy utilization for at least one control volume based on the thermal model. In at least one embodiment, the state variable corresponding to temperature includes at least one temperature derived from the thermal model.

According to some embodiments, the method further includes periodically receiving the measured temperature value for each control volume, and updating the target set point temperature value based on the periodically received measured temperature value.

According to at least one embodiment, the method further includes determining a state space model derived from a linear model of the system, the state space model defined by:

$$\frac{dX}{dt} = AX + BU + d(t)$$

wherein:
A represents a state matrix corresponding to temperature;
X represents a vector state corresponding to temperature;
B represents a command matrix; and
U represents a vector input.

According to another embodiment, the method further includes determining a state space model derived from a non-linear model of the system defined by:

$$\frac{dX}{dt} = AX + g(X, U) + d(t)$$

wherein:
A represents a state matrix corresponding to temperature;
X represents a vector state corresponding to temperature; and
U represents a vector input.

According to various aspects and embodiments, a non-transitory computer readable medium storing instructions executable by at least one processor to execute a temperature control method within a system including a plurality of control volumes is provided. The instructions may be coded to instruct the at least one processor to: receive a measured temperature value for each control volume of the plurality of control volumes, receive a set point temperature value for each control volume, determine a target set point temperature value for each control volume by executing a linear quadratic regulator (LQR) control based on the set point temperature value for the control volume and the measured temperature value for the control volume, transmit the target set point temperature value for each control volume, and generate a control signal for each control volume based on the target set point temperature value for the control volume and the measured temperature value for each control volume.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 3 is a mathematical representation of a method used in accordance with aspects of the invention;

FIGS. 8A and 8B are mathematical representations of a method used in accordance with aspects of the invention;

FIG. 9 is a mathematical representation of a method used in accordance with aspects of the invention;

DETAILED DESCRIPTION

Figure 1:
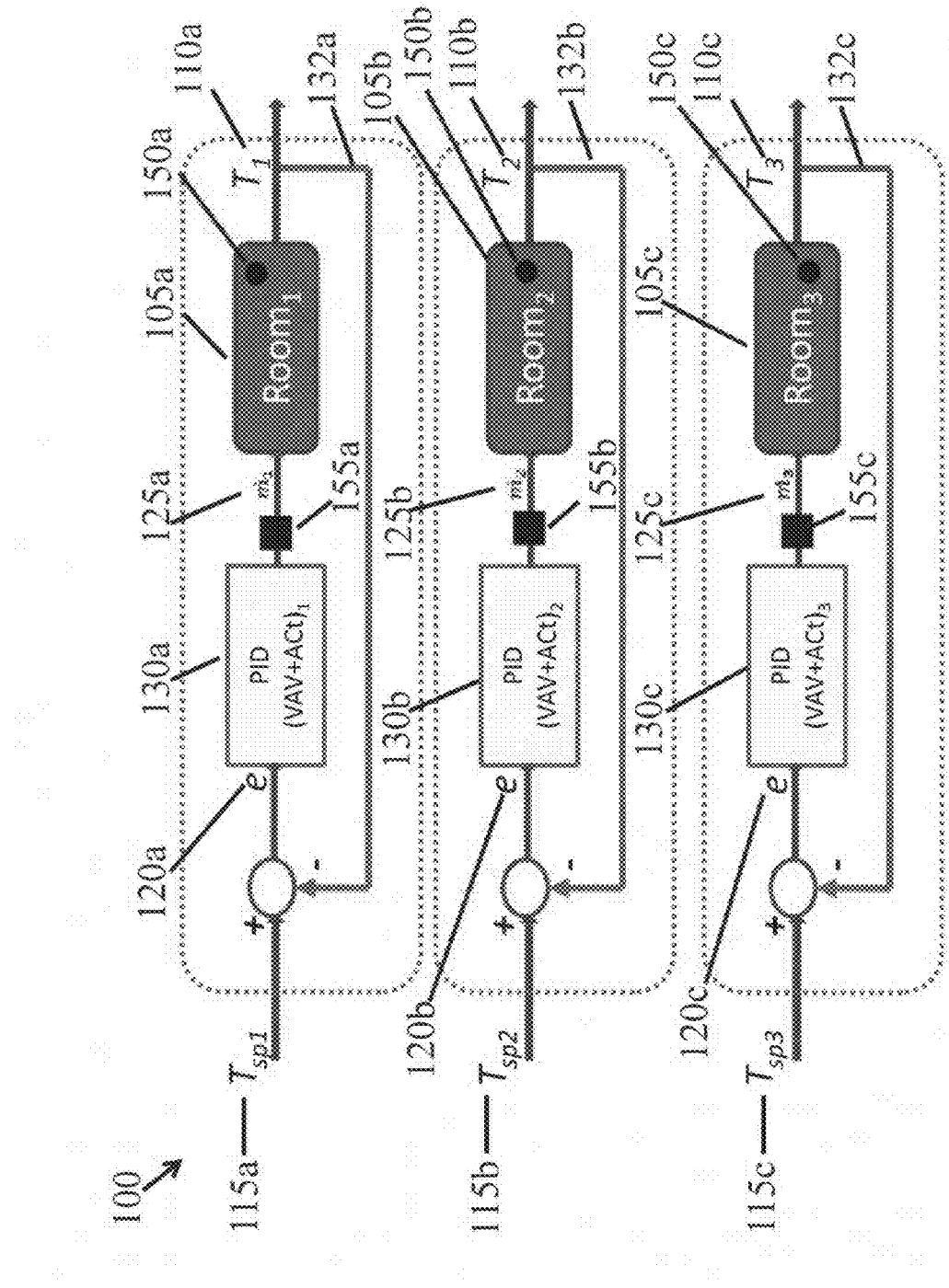
FIG. 1 is a diagram of a first control system according to aspects of the invention.

The methods and systems described herein provide an improved control strategy or system for a building or other structure's heating, ventilation, and air conditioning (HVAC) system. A primary control system is provided that is configured to receive feedback signals carrying information regarding the physical characteristics of air from within a plurality of individual control volumes that are each controlled by a secondary PID type of controller. The primary controller executes a mathematical method to determine target set point temperatures for each of the control volumes. The mathematical method executed by the primary controller takes into account the interdependency of the individual control volumes with each other, which allows the primary and secondary controllers to work together to achieve one or more states set by a user. These states relate to the desired temperature (or comfort) of each control volume and the energy utilization (or energy cost) of each control volume. The control system used by the primary controller is therefore capable of providing the best comfort possible within any existing cost constraint.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls. Moreover, titles or subtitles may be used in the specification for the convenience of a reader, which shall have no influence on the scope of the present invention.

Referring to FIG. 1, a control system, generally indicated at 100, is shown that features a PID control system. The control system 100 includes a plurality of control volumes 105a, 105b, and 105c, where the temperature of each control volume 110a, 110b, and 110c, respectively, is controlled by respective controllers 130a, 130b, and 130c. The plurality of control volumes 105a, 105b, and 105c may be located within one building or structure. For example, control volumes 105a, 105b, and 105c may each be one or more rooms within an office building or residence. According to another example, control volumes 105a, 105b, and 105c may each be one or more rooms within a temperature zone located within an office building or residence. Each control volume has at least one wall that forms, at least in part, the dimensions of the control volume. The control volume may also include a ceiling, floor, doors, or other structures that define the dimensions of the control volume. According to at least one example, the control volume may be a data center. Data centers house electronic devices, such as servers and computer storage devices, and may be used to perform various functions, such as hosting web servers, hosting databases, or any other function that can be performed by computer.

Controllers 130a, 130b, and 130c may each feature a PID style or type of control. Under a PID type of control, set point temperatures 115a, 115b, and 115c are each set by a user(s) using an interface, such as a graphical user interface, coupled to the controller. The set point temperature corresponds to a desired temperature of the corresponding control volume. The set point temperature may be a temperature that reflects the desired level of comfort that a user wishes to experience while living or working or otherwise spending time within the control volume. The set point temperature may also be a temperature that corresponds with safe or optimum working conditions for various pieces of equipment. For example, one or more racks of equipment servers may be located within the control volume. During certain operational modes, the equipment servers may produce a great deal of heat, and the set point temperature may be set to a temperature that is low enough to allow the equipment to operate without overheating.

Each control volume 105a, 105b, and 105c contains one or more sensors 150a, 150b, and 150c, respectively, which may be positioned at one or more locations within the control volume. The sensors may be configured to measure and transmit information related to any one of a number of physical characteristics of the air within the control volume, such as temperature and humidity. For example, each sensor 150a, 150b, and 150c may measure the temperature of each respective control volume 110a, 110b, and 110c and then transmit this information to their respective PID controller 130a, 130b, and 130c in the form of feedback signals 132a, 132b, and 132c. Each PID controller 130a, 130b, and 130c uses its own respective feedback signal 132a, 132b, and 132c transmitted by the one or more sensors 150a, 150b, and 150c to determine a deviation 120a, 120b, and 120c. The deviation is used by the controller to control physical characteristics, such as the temperature, and volume of input air masses 125a, 125b, and 125c that are directed into control volumes 105a, 105b, and 105c. The input air masses 125a, 125b, 125c may be represented below by the following expression:

$$\text{Input air mass: } \dot{m} = \rho_a V$$

where $\rho_a$ is the density of air and V is the volume of air entering the control volume. According to some examples, the temperature of the air associated with the input air mass may correspond to the set point temperature. In some examples, the temperature of the input air mass may correspond to a temperature that is selected to bring the control volume temperature closer to the set point temperature. For example, the temperature of the air directed into the control volume may be at a temperature that is higher than the set point temperature in order to bring the temperature of the air within the control volume to the set point temperature at a faster rate. In certain instances, a larger deviation results in more air at a certain temperature and flow rate being directed into the control volume, whereas a smaller deviation results in less airflow into the control volume.

The control system 100 may further include one or more actuators 155a, 155b, and 155c that are associated with respective input air masses 125a, 125b, and 125c and the respective controllers 130a, 130b, and 130c. The actuators may provide or otherwise assist in controlling the physical characteristics and volume of the air mass that is directed into the control volume. For example, the actuators 155a, 155b, and 155c, may be in communication with a cooler (or heater) that is associated with one or more control volumes and functions to provide cooled or heated input air masses 125a, 125b, and 125c to the control volume via the actuators 155a, 155b, and 155c.

According to at least one embodiment, deviations 120a, 120b, and 120c, which are each calculated by controllers 130a, 130b, and 130c, respectively, represent the difference between the actual value of one or more physical properties of the air within the each control volume, such as control volume temperatures 110a, 110b, and 110c, and the respective set point value set by a user, such as temperatures 115a, 115b, and 115c. The existence of a deviation may result in the controller adjusting the flow rate of air at a certain temperature, otherwise referred to as the input air mass (e.g., $\dot{m} = \rho_a V$ discussed above), into the control volume. Ideally, the value of the deviation is as small as possible. If the deviation falls outside a tolerance, then the controller adjusts properties of the input air mass into the control volume. The tolerance associated with the deviation may be a predetermined value or range of values set by one or more users or by a computer system. In certain embodiments, the tolerance may be zero. For example, the difference between the set point temperature 115a set by a user for control volume 105a and the actual temperature in the room 110a may be 10° F., which is the deviation 120a. If the tolerance is set at 0° F., then this deviation value falls outside the tolerance. The controller 130a then uses the actuator 155a to direct the input air mass 125a with a certain temperature and air flow value into the control volume 105a. For example, if the set point temperature 115a is higher than the temperature of the air 110a in the control volume 105a, then the controller 130a sends a signal or otherwise communicates with the actuator 155a in directing air with a temperature value, such as air with at temperature value of the set point temperature, and a certain flow rate into the control volume 105a.

According to some embodiments, the controller may be configured to "request" or otherwise obtain information about the air in the control volumes via the sensors and feedback signals at periodic time intervals. For example, the controller may request feedback information every five minutes. In other embodiments, the controller may be constantly or continuously obtaining information via the feedback signals.

As discussed above, one or more actuators are controlled by the controller. The actuator is configured to manipulate a characteristic of the airflow supplied to the control volume. For example, the actuator may include a system or device for supplying air at a certain flow rate, temperature, humidity, and/or pressure. For example, the actuator may include or be in communication with a humidifier or dehumidifier configured to vary the absolute humidity of the airflow supplied to the control volume. In another example, the actuator may include or be in communication with a cooling or heating system that provides cooled or heated air to the control volume. The actuator may also include a damper system that includes one or more dampers, such as venting devices, and may also include other devices such as valves and ducts. According to some embodiments, the actuator may include sensors to determine one or more physical properties of the air being supplied to the control volume. These sensors may also be configured to transmit this information to a controller or other component of the system.

The control system 100 described above in reference to FIG. 1 includes three separate control volumes 105a, 105b, and 105c. Each control volume 105a, 105b, and 105c is locally and independently controlled by the respective controller 130a, 130b, and 130c. In other words, there is little or no direct communication between controllers 130a, 130b, and 130c with one another. As a consequence, the controllers 130a, 130b, 130c may not be programmed to regulate the amount of energy consumed to reach the desired level of comfort. This method of control, whether by PID or some other on/off type of control strategy, may waste energy.

Figure 2:
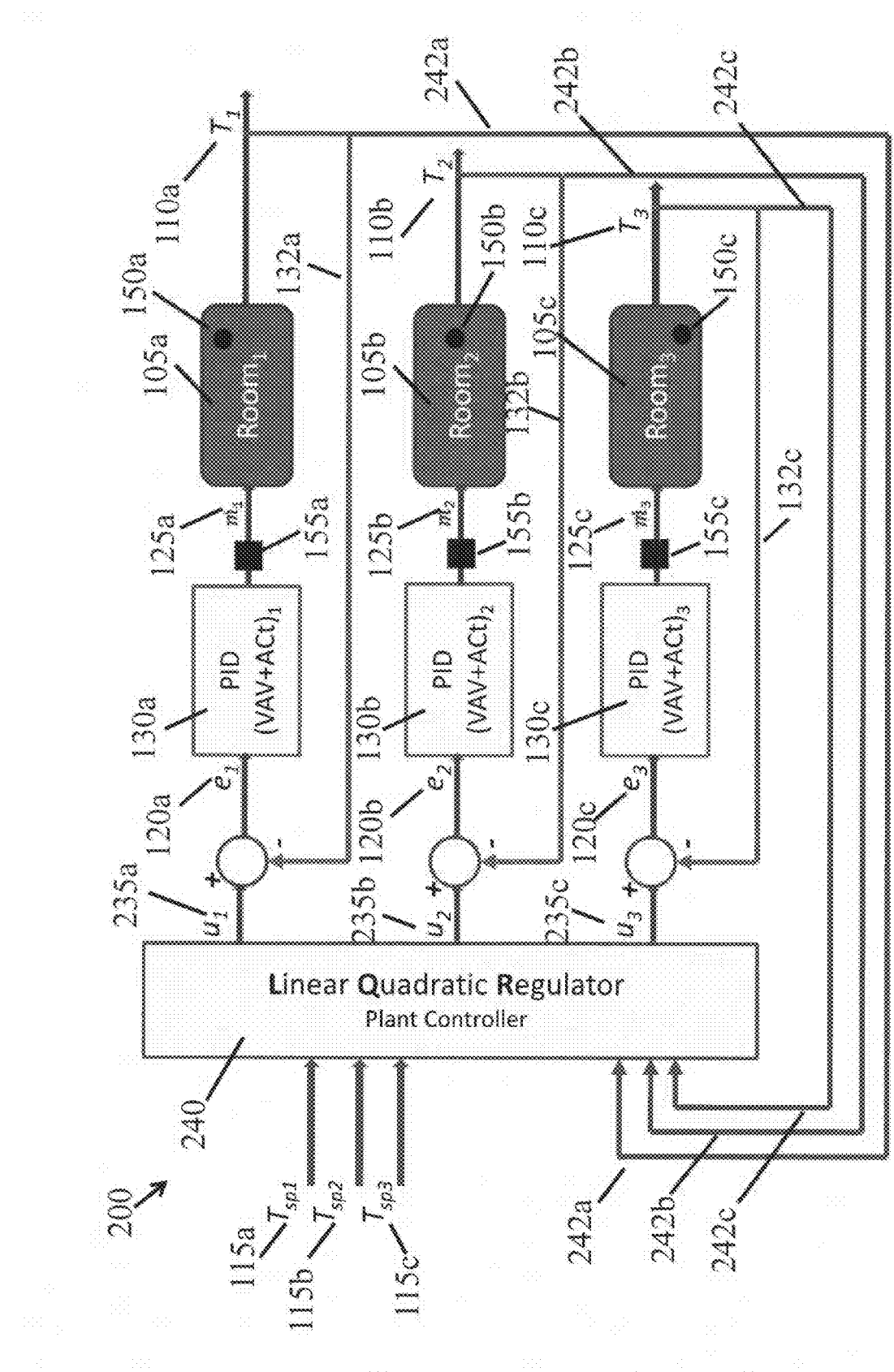
FIG. 2 is a diagram of a second control system according to aspects of the invention.

In contrast, FIG. 2 illustrates a control system, generally indicated at 200, that features some of the same elements discussed above in reference to FIG. 1, such as the plurality of control volumes 105a, 105b, and 105c, controllers 130a, 130b, and 130c, sensors 150a, 150b, and 150c, and actuators 155a, 155b, and 155c. However, control system 200 further includes a primary controller 240 that is used to provide target set point temperatures 235a, 235b, and 235c. The target set point temperatures 235a, 235b, and 235c are each used by their respective secondary controller 130a, 130b, and 130c to determine the respective deviations 120a, 120b, and 120c. The primary controller 240 receives each respective set point temperature 115a, 115b, and 115c from the user instead of each individual controller 130a, 130b, and 130c receiving these values. Further, the primary controller 240 receives feedback signals 242a, 242b, and 242c transmitted by corresponding sensors 150a, 150b, and 150c in a similar manner as secondary controllers 130a, 130b, and 130c receive feedback signals 132a, 132b, and 132c, respectively. Primary controller 240 is configured to accommodate any interdependency that exists between the control volumes 105a, 105b, and 105c. For example, one or more physical characteristics of the air within control volume 105a may influence or otherwise affect one or more physical characteristics of the air within either one or both of control volumes 105b and 105c. Further, control volumes 105a-105c are each supplied by the same air handler.

The primary controller 240 provides the target set point temperatures 235a, 235b, and 235c based on a number of factors. One or more of these factors take into account the interdependency of the control volumes 105a, 105b, and 105c with each other. One such factor includes the comfort level, or desired temperature (such as the set point temperatures 115a, 115b, and 115c), that is input by one or more users by using an interface with the primary controller. Another factor includes energy utilization, or the energy cost by one or more of the control volumes. These two factors are included in the first term and the second term, respectively, of the state equation represented below by Function 1, which is also represented in FIG. 3. Referring to FIG. 3, the desired comfort level of each respective control volume is indicated at 360, and 370 indicates the energy utilization associated with each respective control volume. For example, 370 represents the output of the control system in terms of either heated or cooled air flow that is provided to each of the control volumes to reach the desired level of comfort. This is also indicative of the energy spent to reach this level of comfort, and Function 1 is a function of the difference between the desired temperatures in the control volumes and the actual temperatures in the control volumes. Function 1 therefore forms an integral part of the control scheme programmed into the primary controller 240, with the objective being to minimize "J." When Function 1 is minimized, the deviations from the desired temperatures are minimized while at the same time taking into account the energy input to the control volumes. The quadratic function represented by Function 1 is also referred to as the Linear Quadratic Regulator (LQR) and represents an advanced control technique that utilizes state space representation. State space representations are useful for systems with multiple inputs and multiple outputs, since multiple first-order differential equations can be analyzed in vector form. The differential equations describing the dynamic behavior of the system are derived from energy conservation principles, as described further below.

$$J = \int_0^\infty (x(t)^T Q x(t) + u(t)^T R u(t)) dt \qquad \text{Function 1}$$

In general terms, one of the factors 360 and 370 in Function 1 comes at the cost, or detriment, of the other. For example, a desired comfort level 360, such as the temperature set by a user for a control volume, comes at the expense of energy utilization 370. Likewise, low energy utilization 370 comes at the cost of the desired comfort level 360. The balance between these two factors is used in Function 1 as one determining factor in calculating the target set point temperatures 235a, 235b, and 235c. In other words, the primary controller 240 uses the linear quadratic relationship of Function 1 to compute the target control inputs for the respective secondary or PID controllers 130a, 130b, and 130c.

According to at least one embodiment, a balance between the comfort 360 and cost 370 terms of Function 1 is determined by one or more users, and may be input by a user using an interface with the primary controller 240. In other embodiments, the desired balance may be determined by a computer system. The term "Q" in Function 1 represents a weight matrix for the comfort term 360, which is also represented as 365 in FIG. 3. Similarly, the term "R" in Function 1 represents a weight matrix for the energy utilization term 370, which is also represented as 375 in FIG. 3. For the three separate control volumes featured in FIG. 2, the weight matrices for Q and R would each be represented by a 3×3 matrix. In embodiments with a different number of control volumes, the size of the weighting matrices will vary accordingly. For purposes of illustration, if a user desires to place equal importance on both comfort and cost for each control volume 105a, 105b, and 105c, then Q and R would be identical and take on the form:

$$Q = R = \begin{matrix} 1 & 0 & 0 \\ 0 & 1 & 0 \\ 0 & 0 & 1 \end{matrix}$$

According to another example, if a user desires to place more importance on comfort at the expense of energy utilization for each control volume, then the Q and R matrices may take on the following form:

$$Q = \text{diag}[q_1 q_2 q_3] = \begin{matrix} 10 & 0 & 0 \\ 0 & 10 & 0 \\ 0 & 0 & 10 \end{matrix}$$

$$R = \text{diag}[r_1 r_2 r_3] = \begin{matrix} 0.1 & 0 & 0 \\ 0 & 0.1 & 0 \\ 0 & 0 & 0.1 \end{matrix}$$

The above examples assume equal weighting for each control volume, but it will be appreciated that the values for each control volume may vary accordingly. For example, a user may decide that the desired comfort of the first control volume 105a should carry more weight than the desired comfort level of the second control volume 105b. For instance, the first control volume 105a may be an office space that is used during the daytime, whereas the second control volume 105b may be a residential space that is occupied only during evenings and overnight. Further, the above examples use matrix values that included numerical values of 0.1 and 10, but it is appreciated that the values and/or ranges of values may vary depending on the application, including the size and nature of the control volume(s).

In at least one embodiment, the primary controller 240 may be programmed or otherwise configured to vary or otherwise change the weighting matrices Q and R at predetermined or periodic time intervals. For example, during periods of the day where energy costs are high, the desire to keep energy costs low may be more highly desired, which will be reflected in the values that populate the weighting matrix R.

The target set point temperatures 235a, 235b, and 235c, generated by the primary controller 240, correspond to the input vector $u(t)^T$ of the state equation of Function 1, also shown as 380 in FIG. 3, and are generally expressed as:

$$U = [\dot{m}_1, \dot{m}_2, \dot{m}_3]^T$$

where each element represents the air mass entering each respective control volume at a temperature designed to bring the temperature of the control volume to the target set point temperature. The members of the input vector 380 therefore affect the state vector variables, including the temperature of the wall and temperature of the control volume, as discussed further below.

According to at least one embodiment, the primary controller 240 may use a thermal model as part of its control scheme. For example, the primary controller may use the thermal model in determining the state and/or input variables of the state equation represented in Function 1. The basic premise behind the thermal model is based on energy conservation principles, such that at any given location in the system, heat in=heat out+heat stored. Each term is based on the classical heat transfer equations shown in FIG. 4 and is discussed further below. For example, the basic equation of heat storage is:

$$Q = mC_p \frac{dT}{dt}$$

where Q is the heat flow, m is the mass, $C_p$ is the specific heat capacity, and dT/dt is the rate of change of temperature. In general terms, heat capacity describes how much energy is required to increase the temperature by a specified amount, which is proportional to the mass of the object.

Figure 4:
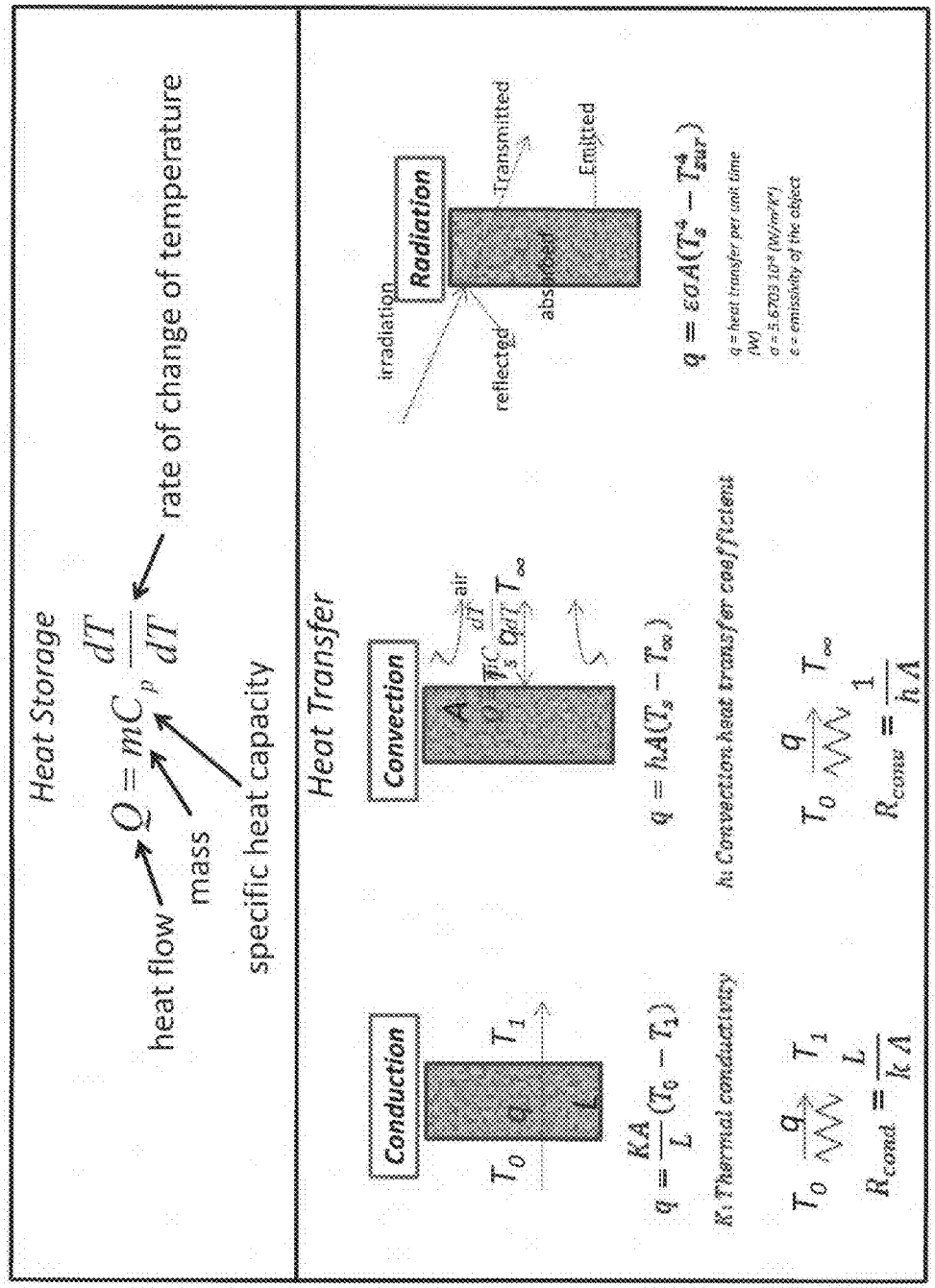
FIG. 4 is a graphical representation of heat storage and three different forms of heat transfer in accordance with aspects of the invention.

Referring to FIG. 4, thermal conduction is the process of heat transfer from one part of a body at a higher temperature to another (or between bodies in direct contact) at a lower temperature. The basic equation of heat conduction is:

$$q = \frac{kA(T_0 - T_1)}{L}$$

where q is the quantity of heat flow, k is the thermal conductivity of the material, i.e., the wall, "A" is the area of the material, $T_0$ is the temperature of the hot surface, i.e., air in the control volume, and $T_1$ is the temperature of the cold surface, i.e., interior wall surface.

Referring again to FIG. 4, thermal convection is the transfer of heat from one part of a fluid, such as a gas, to another part at a lower temperature by mixing of fluid particles. Heat transfer by convection may take place, for example, at the surface of walls, floors, and roofs. The rate of heat transfer by convection from a surface of area "A," can be written as:

$$q = hA(T_s - T_\infty)$$

where q is the rate of heat transfer by convection, h is the heat transfer coefficient, $T_s$ is the temperature of the surface, i.e., surface temperature of the wall, and $T_\infty$ is the temperature of the fluid, i.e., air.

Also featured in FIG. 4 is the concept of heat transfer via radiation, which is the heat transfer from a body by virtue of its temperature. When two or more bodies at different temperatures exchange heat by radiation, heat will be emitted, absorbed, and reflected by each body. In the case of buildings, the radiation exchange between the exposed surfaces can be written as:

$$q = \epsilon \sigma A(T_s^4 - T_{sur}^4)$$

where $\epsilon$ is the emissivity of the building's surface, i.e., the wall, $\sigma$ is the Stefan-Boltzmann constant, "A" is the area of the exposed surface, i.e., surface area of the wall, $T_s$ is the temperature of the surface, i.e., a small surface such as a radiator, and $T_{sur}$ is the temperature of the surroundings, which in certain instances, is the surface temperature of the wall.

Figure 5:
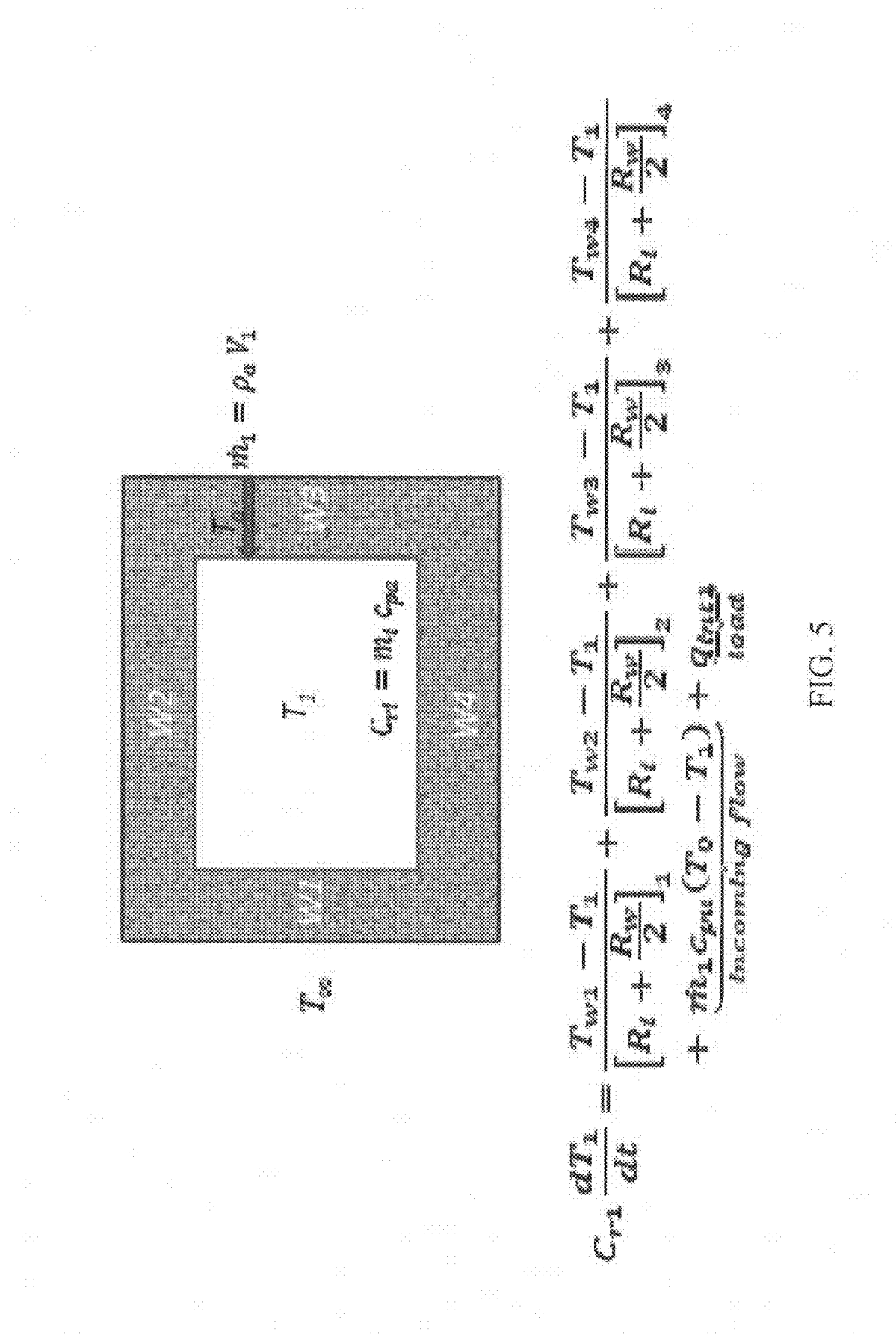
FIG. 5 is a graphical representation of a thermal model of a single control volume in accordance with aspects of the invention.

An example of a simple thermal model for a single control volume is shown in FIG. 5. The room includes four walls, W1-W4, and featured at the bottom of FIG. 5 is a differential heat equation whose solution provides the temperature distribution in a stationary medium and is based on applying conservation of energy:

$$C_{r1}\frac{dT_1}{dt} = \frac{T_{w1} - T_1}{\left[R_i + \frac{R_w}{2}\right]_1} + \frac{T_{w2} - T_1}{\left[R_i + \frac{R_w}{2}\right]_2} +$$

$$\frac{T_{w3} - T_1}{\left[R_i + \frac{R_w}{2}\right]_3} + \frac{T_{w4} - T_1}{\left[R_i + \frac{R_w}{2}\right]_4} + \dot{m}c_{pa}(T_0 - T_1) + q_{int1}$$

where the left side of the equation represents the change in thermal energy storage and the first four terms on the right side of the equation represent the net transfer of thermal energy into the control volume (assuming energy transfer is exclusively by conduction). The fifth term is the heat contribution from the incoming air mass and the last term represents thermal energy (i.e., heat) generated from within the control volume, for example, by people, lighting fixtures, computing equipment, etc.

The temperature of each wall $T_{wi}$ is determined by a number of factors, including the thickness and type of material used in the wall's construction, and the presence or absence of any insulation material. The position of the wall within the room and within the overall structure may also influence its temperature. For example, walls adjacent the outside environment may be colder or hotter than interior walls, depending on the temperature and/or other environmental conditions of the outside environment. Building construction design information, such as the thermal conductivity of materials, the size of the rooms, etc. may be used to determine a multidimensional heat transfer model of the building. This information may be input by a user or obtained through other means to the primary controller. In certain instances, and as discussed further below, the thermal model may be used to determine the energy input into a building. Thus, the thermal model may be used by the primary controller 240 as part of its calculations in determining the target set point temperatures 235a, 235b, and 235c.

Figure 6:
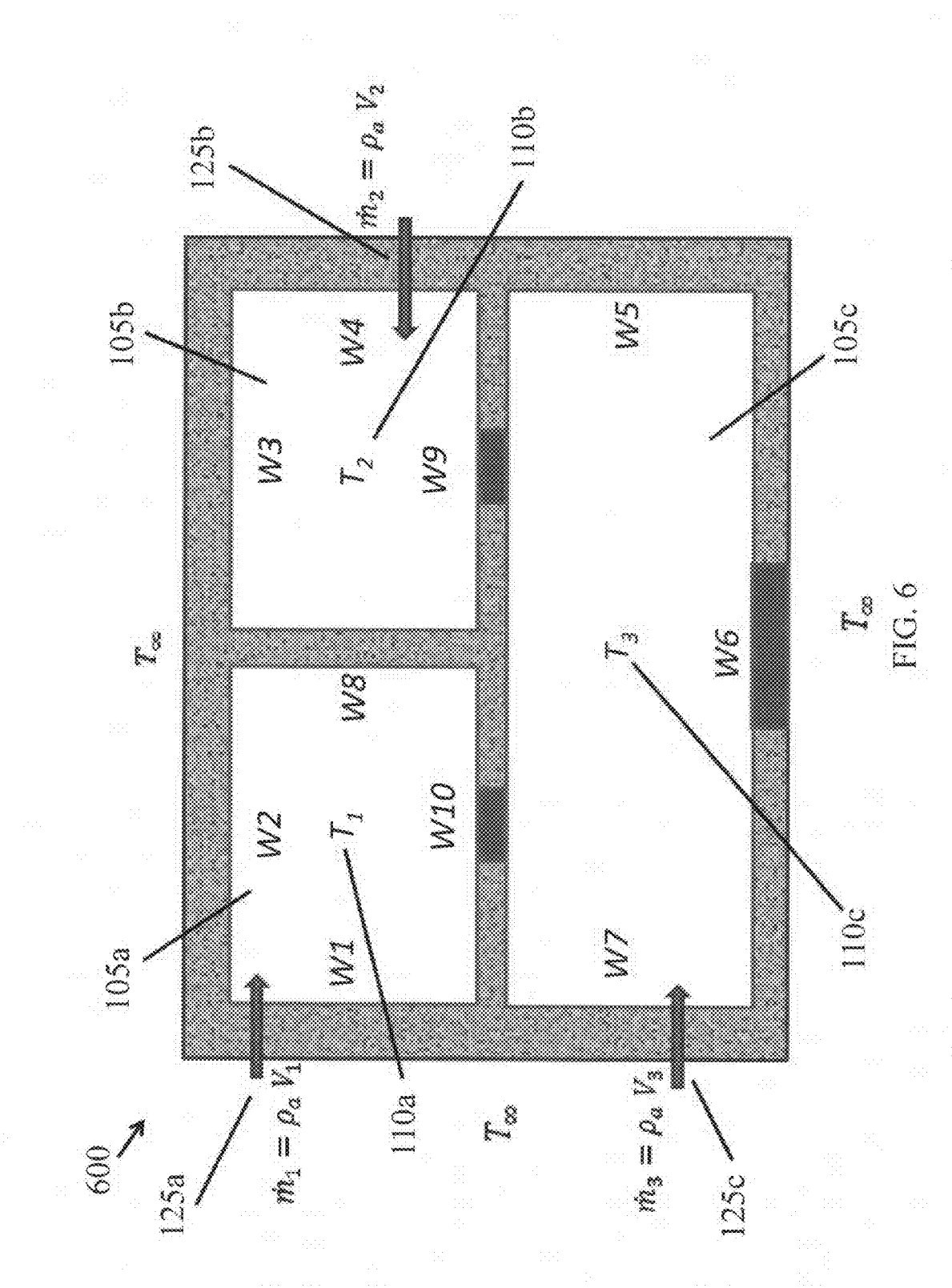
FIG. 6 is a graphical representation of a thermal model that includes three control volumes in accordance with aspects of the invention.

The thermal model for the single control volume shown in FIG. 5 may be expanded to include three control volumes 105a, 105b, 105c, as discussed above, which is represented graphically in FIG. 6. As shown, FIG. 6 features a thermal model, generally indicated at 600, for the three control volumes 105a, 105b, and 105c, which each contain air at temperatures 110a, 110b, and 110c, respectively. Also included are the input air masses, represented by 125a, 125b, and 125c respectively. The thermal model 600 also includes walls W1-W10, which represent walls that comprise the control volumes. For example, control volume 105a is bounded by four walls, W1, W2, W8, and W10 and control volume 105b is bounded by walls W8, W3, W4, and W9, where W8 is shared by both control volumes 105a and 105b.

Figure 7:
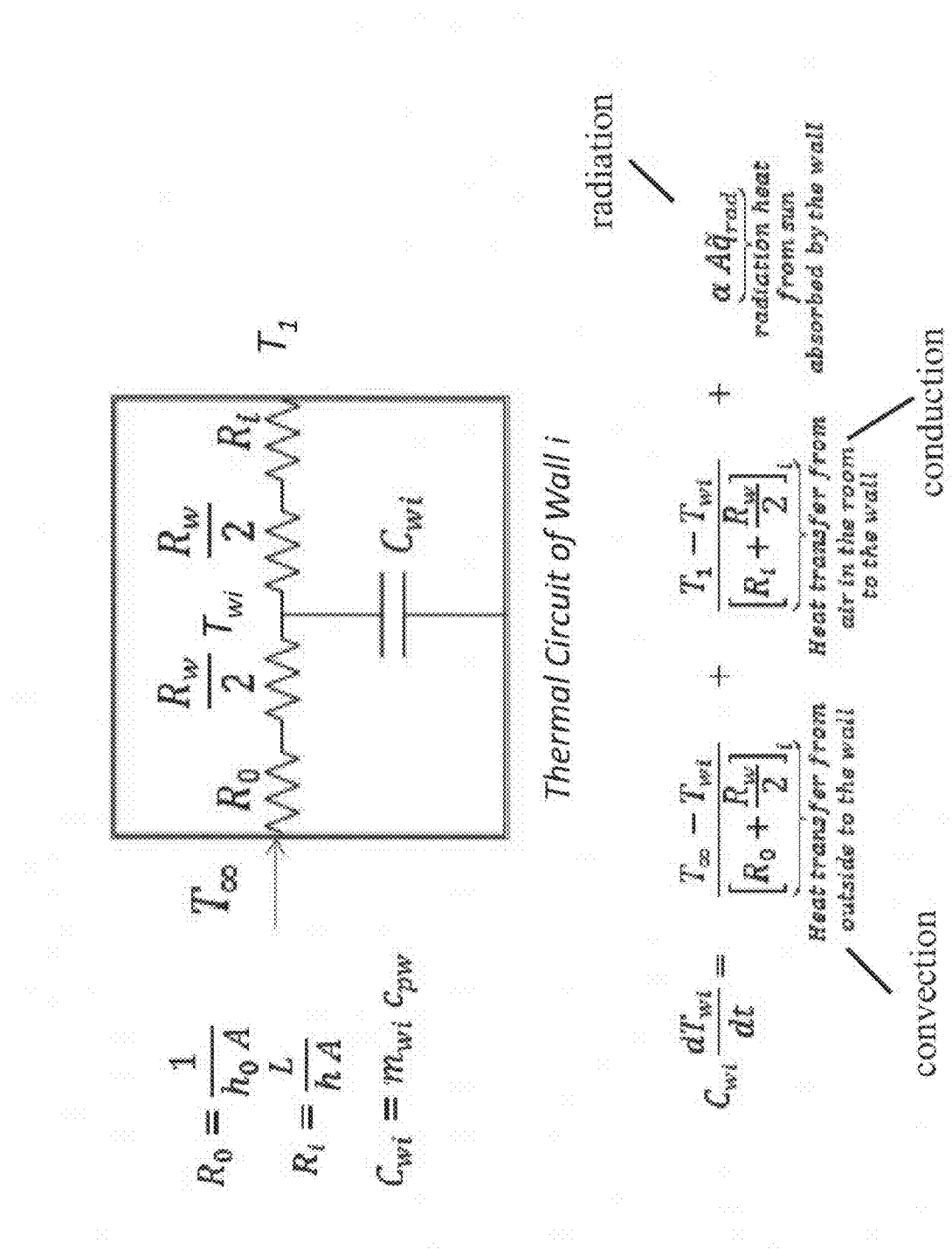
FIG. 7 is a graphical representation of a thermal circuit of a wall in accordance with aspects of the invention.

In accordance with at least one embodiment, a thermal circuit, including a differential heat balance equation, of a single wall is shown in FIG. 7. The thermal circuit is based on an analogy between diffusion of heat and electrical charge. Specifically, just as electrical resistance is associated with the transfer of electricity, a thermal resistance may be associated with the transfer of heat. For one-dimensional heat transfer with no internal energy generation and with constant properties, and defining resistance as the ratio of a driving potential to the corresponding transfer rate, it follows from the equation of heat convection described above that $R_0$, the thermal resistance attributed to convection in a plane wall, may be expressed as:

$$R_0 = \frac{1}{h_0 A}$$

where "A" is the surface area of the wall and $h_0$ is the coefficient of convective heat transfer. Likewise, based on the equation of heat conduction discussed above, it follows that $R_i$, the thermal resistance attributed to conduction, may be expressed as:

$$R_i = \frac{L}{hA}$$

where A is the area of the wall, L is the thickness of the wall, and h is the thermal conductivity of the wall. $C_{wi}$ relates to the heat capacitance of the wall, and may generally be expressed as:

$$C_{wi} = m_{wi} c_{pw}$$

where $m_{wi}$ is the mass and $c_{pw}$ is the specific heat capacity of the wall.

As mentioned above, one or more of the properties associated with the heat transfer equations, such as the thermal conductivity of the wall (h), or the area of the wall (A) may be input or otherwise communicated to the primary controller. These properties, including one or more other properties discussed below in reference to conduction, convection, and radiation, comprise physical data that is used by the system to generate and construct the thermal model.

The thermal circuit is a representation of the resistance to heat flow as though it were a resistor, and the heat storage elements can be represented as capacitors. Further, temperature can be represented as potential. The thermal circuit, or rate of heat transfer through the wall, is shown on the bottom of FIG. 7 and may be expressed as Equation 1 below:

$$C_{wi} \frac{dT_{wi}}{dt} = \frac{T_\infty - T_{wi}}{\left[R_0 + \frac{R_w}{2}\right]_i} + \frac{T_1 - T_{wi}}{\left[R_i + \frac{R_w}{2}\right]_i} + \alpha A \tilde{q}_{rad} \quad \text{Equation 1}$$

where the left side of the equation generally represents the change in thermal energy storage and each of the terms on the right side of the equation are associated with the convection, conduction, and radiation methods of heat transfer, respectively. External disturbances such as heat generation are omitted from Equation 1. The transmission of heat through the wall may thus be considered as a network with three resistances in series, each of which is discussed further below. Specifically, the convection term can be expressed as:

$$\text{convection} = \frac{T_\infty - T_{wi}}{\left[R_0 + \frac{R_w}{2}\right]_i}$$

where $T_\infty$ is the temperature of air external to the wall and $R_w$ is the total heat resistance of the wall, making the heat resistance for each side of the wall $R_w/2$. Likewise, the conduction term can be expressed as:

$$\text{conduction} = \frac{T_1 - T_{wi}}{\left[R_i + \frac{R_w}{2}\right]_i}$$

where $T_1$ is the temperature of the internal air, determined by taking measurements, as discussed above. In this instance, radiation may be associated with the amount of heat transferred to the wall from an external source of radiation, such as the sun, and can be expressed as:

$$\text{radiation} = \alpha A \tilde{q}_{rad}$$

where $\alpha$ represents the absorption coefficient of the wall, "A" is the surface area of the wall, and $q_{rad}$ represents the thermal energy generation attributed to radiation heat from the sun, or the total amount of radiation heat that reaches the wall.

The thermal model may therefore be derived from using one or more of the heat transfer equations or terms discussed above, for example, using Equation 1, and thus may be used to solve for $T_{w1}$-$T_{w10}$. The thermal model is therefore configured to take into account heat transfer in both internal and external walls. Other surfaces may also be included in the thermal model, including ceilings, roofs, floors, doorways, etc.

Returning to Function 1, the $x(t)^T$ term, which is expressed as 362 in the mathematical expression of FIG. 3, represents the state variable that changes over time, which in this instance is the temperature of each individual wall, $T_{w1}$-$T_{w10}$ and the temperature of the air in each control volume $T_1$-$T_3$ (110a, 110b, and 110c). Thus, the state variable 362 may be expressed as a 13-state vector:

$$X = [T_{w1}, T_{w2}, T_{w3}, T_{w4}, T_{w5}, T_{w6}, T_{w7}, T_{w8}, T_{w9}, T_{w10}, T_1, T_2, T_3]^T$$

and, as previously discussed, the input vector $u(t)^T$ 380 may be expressed as the vector:

$$U = [\dot{m}_1, \dot{m}_2, \dot{m}_3]^T$$

Figure 8B:
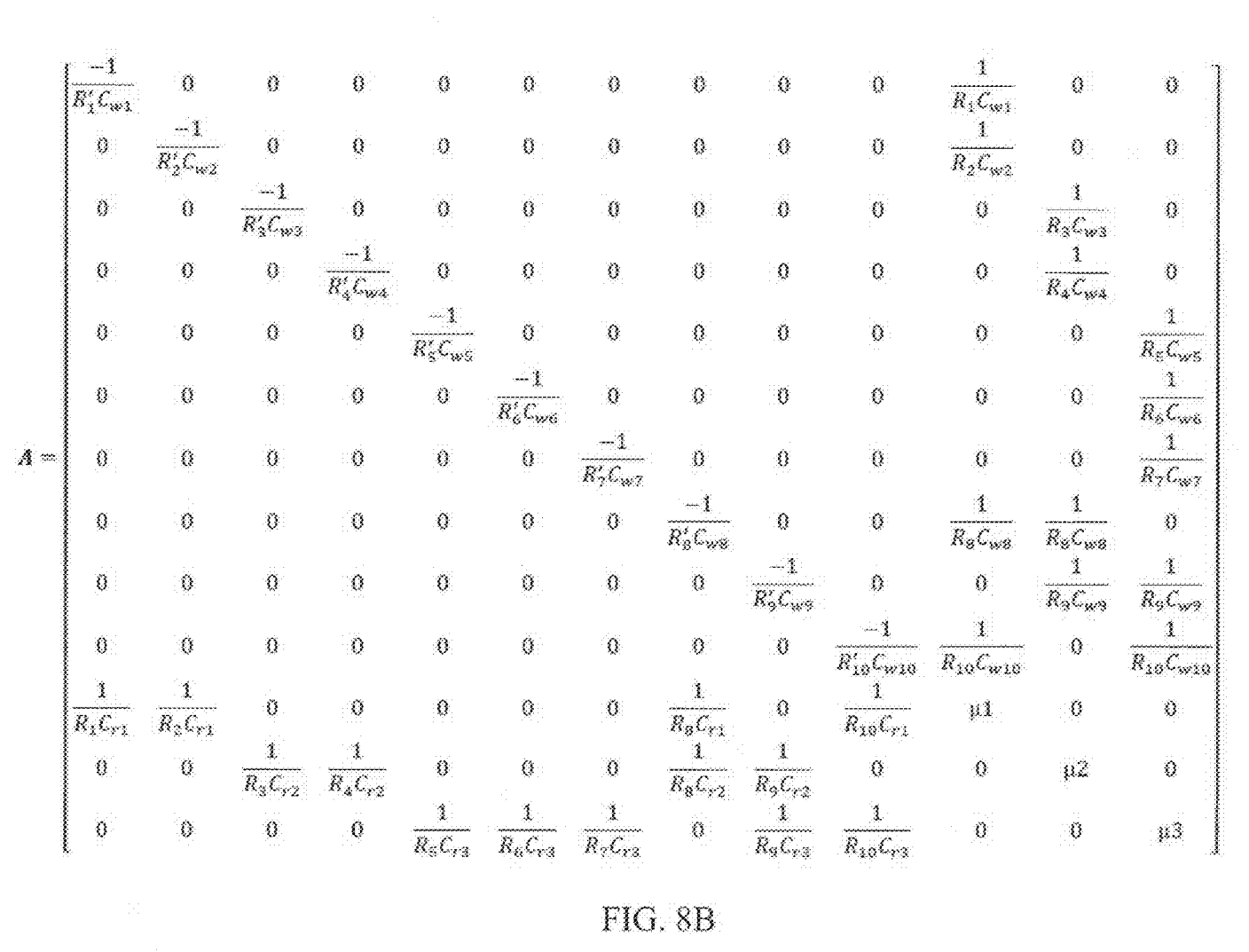

According to some embodiments, the LQR expression of Function 1 may execute a state space model that takes the form of Equation 2, which is also shown in FIG. 8A:

$$\frac{dX}{dt} = AX + g(X, U) + d(t) \quad \text{Equation 2}$$

where "A" is the state matrix shown in FIG. 8B, $C_{wi}$ is the heat capacitance of wall i, $R_j$ is the thermal resistance of air in control volume j, $R_{wi}$ is the thermal resistance of wall i, $C_{rj}$ is the specific heat capacity of air in control volume j, and where R, $R_i'$ and $\mu_i$ are defined as:

$$\frac{1}{R} = \frac{1}{R_j + R_{wi}/2}$$

$$\frac{1}{R_i'} = \frac{1}{R_0 + R_{wi}/2} + \frac{1}{R_j + R_{wi}/2}$$

$$\mu_1 = \frac{-1}{C_{r1}} \left( \frac{1}{R_1} + \frac{1}{R_2} + \frac{1}{R_8} + \frac{1}{R_{10}} \right)$$

$$\mu_2 = \frac{-1}{C_{r2}} \left( \frac{1}{R_3} + \frac{1}{R_4} + \frac{1}{R_9} + \frac{1}{R_8} \right)$$

$$\mu_3 = \frac{-1}{C_{r3}} \left( \frac{1}{R_5} + \frac{1}{R_6} + \frac{1}{R_7} + \frac{1}{R_{10}} \right)$$

and $R_0$ is the thermal resistance of the outside air, i.e., air external to the control volumes.

In addition, d(t) is the matrix shown in FIG. 8A, where α represents the absorption coefficient of the wall, which in this example is assumed to be constant for all the walls, $q_{radi}''$ is the thermal energy generation attributed to radiation for wall i, and $A_i$ is the surface area of wall i, as discussed above in reference to heat transfer attributed to radiation. Further, $T_\infty$ is the temperature of air external to the wall, as discussed above in reference to heat transfer attributed to convection, and $q_{intj}$ is the thermal energy generated from within the control volume j, also discussed above. Thus, external disturbances, such as heat generation are included in the state space model expressed by Equation 2. In addition, g(X,U) is shown in FIG. 8A and is represented by:

$$g(X, U) = \begin{bmatrix} 0 & 0 & 0 \\ 0 & 0 & 0 \\ 0 & 0 & 0 \\ 0 & 0 & 0 \\ 0 & 0 & 0 \\ 0 & 0 & 0 \\ 0 & 0 & 0 \\ 0 & 0 & 0 \\ 0 & 0 & 0 \\ \frac{C_p}{C_{r1}}(T_0 - T_1) & 0 & 0 \\ 0 & \frac{C_p}{C_{r2}}(T_0 - T_2) & 0 \\ 0 & 0 & \frac{C_p}{C_{r3}}(T_0 - T_3) \end{bmatrix} \begin{bmatrix} \dot{m}_1 \\ \dot{m}_2 \\ \dot{m}_3 \end{bmatrix}$$

where $C_{rj}$ is the specific heat capacity of the air in control volume j, and $T_j$ is the temperature of the air in control volume j. $T_0$ represents the temperature of the cooled (or heated) air mass provided to each control volume from the cooler (or heater) using one or more actuators, as discussed above. According to this example, $T_0$ is considered to be a constant value for all control volumes. $C_p$ is the specific heat capacity of air, and in this example, is considered to be constant at a value of 1.006 kJ/kg·K. The system represented in Equation 2 is non-linear, in that "g" is a function of both the state (X) and the input (U).

Assuming that the system operates within a finite region, the system may be characterized as a linear state space model and take the form of Equation 3 below, which is also shown in FIG. 9. Thus, the LQR expression of Function 1 may execute a state space model that takes the form of Equation 3:

$$\frac{dX}{dt} = AX + BU + d(t) \quad \text{Equation 3}$$

where "A" is the state matrix shown in FIG. 8B, as discussed above, and "B" is the command matrix represented by:

$$B = \begin{bmatrix} 0 & 0 & 0 \\ 0 & 0 & 0 \\ 0 & 0 & 0 \\ 0 & 0 & 0 \\ 0 & 0 & 0 \\ 0 & 0 & 0 \\ 0 & 0 & 0 \\ 0 & 0 & 0 \\ 0 & 0 & 0 \\ \frac{C_p}{C_{r1}}(T_0 - T_{sp_1}) & 0 & 0 \\ 0 & \frac{C_p}{C_{r2}}(T_0 - T_{sp_2}) & 0 \\ 0 & 0 & \frac{C_p}{C_{r3}}(T_0 - T_{sp_3}) \end{bmatrix}$$

where $T_{spj}$ is the set point temperature for the air in control volume j.

Equation 3 is therefore a Jacobian linearization which generally states that a nonlinear differential equation can be accurately approximated by a first degree linear differential equation so long as the perturbations to the system are small. In other words, the system is limited around an operating point, or equilibrium point, and the input change is limited within a small range around this equilibrium point. For instance, the equilibrium point may be the set point temperature (such as 115a, 115b, or 115c). The linear state space model applies when the control volume temperature (such as 110a, 110b, and 110c) does not deviate widely from the set point temperature. Under these conditions, the first degree linear equation is a good enough approximation model to determine the control parameters.

In general terms, for a continuous-time linear system described by $\dot{x}=Ax+Bu$, Function 1 may be defined as:

$$J=\int_0^\infty (x^TQx+u^TRu)dt$$

and the feedback gain matrix K, or the output vector, is found from the solution that minimizes Function 1 through the state-feedback control law:

$$u=-Kx$$

where K is a properly dimensioned matrix given by $$K=R^{-1}B^TP$$

and P is found by solving the continuous time algebraic Riccati equation:

$$A^TP+PA-PBR^{-1}B^TP+Q=0$$

Once the gain matrix (K) is determined, it may then be used in the primary controller to generate a new "A" matrix for the system subject to:

$$A_{i+1}=A_i-B_i*K$$

For a discrete-time linear system described by $x_{k+1}=Ax_k+Bu_k$, Function 1 may be defined as the performance index:

$$J = \sum_{k=0}^{\infty} (x_k^T Q x_k + u_k^T R u_k)$$

and the optimal control sequence that minimizes the performance index is given by:

$$u_k = -Fx_k$$

where $$F = (R+B^TPB)^{-1}B^TPA$$

and P is the unique positive definite solution to the discrete time algebraic Riccati equation given by $$P = Q + A^T(P - PB(R+B^TPB)^{-1}B^TP)A$$

which may be solved by iterating the dynamic Riccati equation, discussed further below, of the finite-horizon case until it converges.

For a finite-horizon, discrete-time linear system described by $x_k = Ax_{k-1} + Bu_k$, the performance index is defined by:

$$J = \sum_{k=0}^{N}(x_k^T Q x_k + u_k^T R u_k)$$

and the optimal control sequence that minimizes the performance index is given by:

$$u_k = -F_k x_{k-1}$$

where $$F_k = (R + B^T P_k B)^{-1} B^T P_k A$$

and $P_k$ is found iteratively backwards in time by the dynamic Riccati equation given by:

$$P_{k-1} = Q + A^T(P_k - P_k B(R + B^T P_k B)^{-1} B^T P_k)A$$

from initial condition $P_N = Q$.

Figure 10:
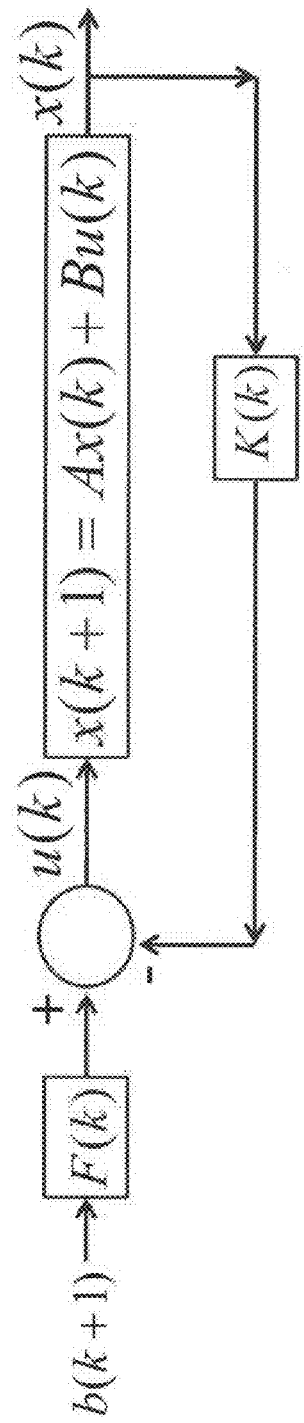
FIG. 10 is a discrete mathematical representation and a control system of a method used in accordance with aspects of the invention.

According to one example, a discrete implementation of Function 1 may be represented by Equation 4 below, which is also shown in FIG. 10:

$$u(k) = F(k)b(k+1) - K(k)x(k) \qquad \text{Equation 4}$$

where:

$$K(k) = [R + B^T P(k+1)B]^{-1} B^T P(k+1)A,$$

and $$F(k) = -[R + B^T P(k+1)B]^{-1} B^T$$

A graphical representation of the control system featuring Equation 4 is also shown in FIG. 10. In at least one embodiment, the control signal for the time index k for each secondary controller is defined by Equation 4. As explained above, the secondary controller may be a PID controller.

According to a further embodiment that includes a discrete implementation, the primary controller 240 is configured to use energy information, such as energy information generated by the thermal model discussed above, to predict the energy utilization required to achieve a desired environment. In general terms, given a state X(t) at time "t," the thermal model may be used to calculate, or predict, the value of the state at X(t+1) at time "t+1". Once X(t+1) is determined, then the input variable can be determined. In essence the command U(t) at time "t" is calculated using the predicted state at time "t+1" and the previous calculated command u(t−1):

$$U(t) = f(x(t+1), U(t-1))$$

The primary controller 240 may therefore be configured to use both measured and predicted values in determining the target set point temperatures 235a, 235b, and 235c.

According to some embodiments, the thermal model may also be expanded to use heat transfer information from other components of the building or structure housing the control volumes, such as the ceiling, floors and roof. Heat transfer information similar to that described in reference to FIG. 7 may be used in determining the relevant energy calculations for the building.

Although the examples discussed above in reference to FIGS. 1 and 2 include three control volumes (105a, 105b, 105c), other numbers of control volumes are within the scope of this disclosure. For example, two or more control volumes may be included in the control system 200 discussed above. The number of control volumes included in the control system may include any number of control volumes that are capable of functioning with the control scheme as disclosed. Further, the control system is also capable of controlling other desired physical properties of the air, such as humidity. For example, the sensors within the control volume may be configured to transmit humidity data to the primary controller, which is then used by the primary controller in combination with a set point humidity (determined or otherwise established by a user or computer system) to determine a target set point humidity. Thus, Function 1 may be modified to further include a desired humidity in a treatment that is similar to that for the temperature.

The primary controller 240 described above uses a control strategy that offers several advantages over PID or other on/off types of control strategies configured for existing HVAC systems. First, the Linear Quadratic Regulator included in the control scheme of primary controller 240 allows actual energy utilization and predicted energy utilization to be taken into account, which reduces the energy demands of the building. The reduced energy demands lead to cost savings in operating the building or other structure that uses the control scheme. Further, the primary controller is capable of being retrofitted into an existing structure that uses an already-existing PID or other type of on/off controller.

Example Temperature Control System

Figure 11:
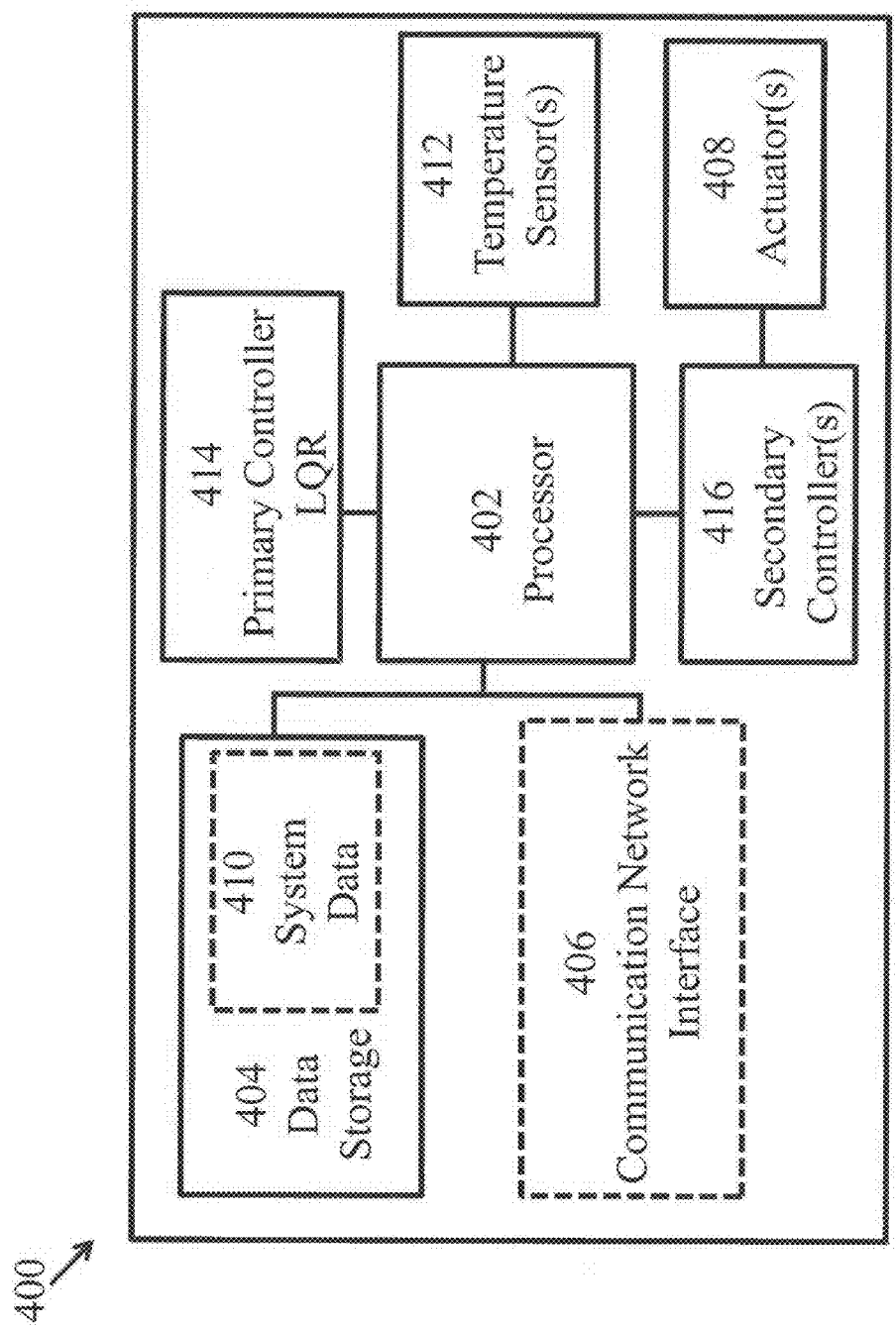
FIG. 11 is a functional block diagram of one example of a temperature control system in accordance with aspects of the invention.

FIG. 11 illustrates a temperature control system 400 that is configured to control the temperature of the air within a plurality of control volumes. As shown in FIG. 11, the temperature control system 400 comprises a processor 402 coupled to data storage 404, an optional communication network interface 406, secondary controller(s) 416, temperature sensor(s) 412, and a primary controller 414. The data storage 404 may also optionally store system data 410. The secondary controller(s) 416 are coupled to one or more actuators 408.

According to the embodiment illustrated in FIG. 11, the processor 402 performs a series of instructions that result in manipulated data that is stored and retrieved from the data storage 404. According to a variety of examples, the processor 402 is a commercially available processor, such as a processor manufactured by Texas Instruments, Intel, AMD, Sun, IBM, Motorola, and ARM Holdings, for example. It is appreciated that the processor 402 may be any type of processor, multiprocessor or controller, whether commercially available or specially manufactured.

In addition, in several embodiments the processor 402 is configured to execute a conventional real-time operating system (RTOS), such as RTLinux. In these examples, the RTOS may provide platform services to application software, such as some software associated with the primary controller 414 and secondary controller 416 discussed above. These platform services may include inter-process and network communication, file system management, and standard data store manipulation. One or more operating systems may be used, and examples are not limited to any particular operating system or operating system characteristic. For instance, in some examples, the processor 402 may be configured to execute a non-real time operating system, such as BSD or GNU/Linux. It is appreciated that the processor 402 may execute an Operating System Abstraction Library (OSAL).

The primary controller 414 and secondary controller 416 may be implemented using hardware, software, or a combination of hardware and software. For instance, in one example, the primary controller 414 and secondary controller 416 are implemented as software components that are stored within the data storage 404 and executed by the processor 402. In this example, the instructions included in the primary controller 414 program the processor 402 to generate control signals for one or more actuators 408 coupled to the secondary controller 416. As discussed above, the instructions included in the primary controller 414 may be based on LQR control strategy. In other examples, the primary controller 414 and secondary controller 416 may each be an application-specific integrated circuit (ASIC) that is coupled to the processor 402. Thus, examples of the primary controller 414 and secondary controller 416 are not limited to a particular hardware or software implementation. The temperature control system 400 may execute one or more processes to control the temperature of the air within each control volume. One example of a process performed by the primary controller 414 and secondary controller 416 is discussed further below with reference to FIG. 12.

According to some embodiments, one or more of the components disclosed herein, such as the primary controller 414 and secondary controller 416, may read parameters that affect the functions they perform. These parameters may be physically stored in any form of suitable memory including volatile memory, such as RAM, or nonvolatile memory, such as a flash memory or magnetic hard drive. In addition, the parameters may be logically stored in a proprietary data structure, such as a database or file defined by a user mode application, or in a commonly shared data structure, such as an application registry that is defined by an operating system.

The data storage 404 includes a computer readable and writeable nonvolatile data storage medium configured to store non-transitory instructions and data. In addition, the data storage 404 includes processor memory that stores data during operation of the processor 402. In some examples, the processor memory includes a relatively high performance, volatile, random access memory such as dynamic random access memory (DRAM), static memory (SRAM) or synchronous DRAM. However, the processor memory may include any device for storing data, such as a non-volatile memory, with sufficient throughput and storage capacity to support the functions described herein. According to several examples, the processor 402 causes data to be read from the nonvolatile data storage medium into the processor memory prior to processing the data. In these examples, the processor 402 copies the data from the processor memory to the non-volatile storage medium after processing is complete. A variety of components may manage data movement between the non-volatile storage medium and the processor memory and examples are not limited to particular data management components. Further, examples are not limited to a particular memory, memory system, or data storage system.

The instructions stored on the data storage 404 may include executable programs or other code that can be executed by the processor 402. The instructions may be persistently stored as encoded signals, and the instructions may cause the processor 402 to perform the functions described herein. The data storage 404 also may include information that is recorded, on or in, the medium, and this information may be processed by the processor 402 during execution of instructions. For example, the medium may be optical disk, magnetic disk, or flash memory, among others, and may be permanently affixed to, or removable from, the temperature control system 400.

In some embodiments, the system data 410 includes data used by the primary controller 414 to improve the temperature control strategy. More particularly, the system data 410 may include physical data related to the control volumes, such as data discussed above that is used for generating a thermal model of the system. The system data 410 may be stored in any logical construction capable of storing information on a computer readable medium including, among other structures, flat files, indexed files, hierarchical databases, relational databases or object oriented databases. These data structures may be specifically configured to conserve storage space or increase data exchange performance. In addition, various examples organize the system data 410 into particularized and, in some cases, unique structures to perform the functions disclosed herein. In these examples, the data structures are sized and arranged to store values for particular types of data, such as integers, floating point numbers, character strings, arrays, linked lists, and the like. It is appreciated that the primary controller 414 and the system data 410 may be combined into a single component or re-organized so that a portion of the system data 410 is included in the primary controller 414. Such variations in these and the other components illustrated in FIG. 11 are intended to be within the scope of the embodiments disclosed herein.

As shown in FIG. 11, the temperature control system 400 also includes communication network interface 406, actuator(s) 408, and temperature sensor(s) 412. Each of these components is a specialized device or is configured to exchange (i.e., send or receive) data with one or more specialized devices that may be located within the temperature control system 400 or elsewhere. Each of these components may include hardware, software, or a combination of both hardware and software that functions to physically and logically couple one or more elements with one or more other elements of the temperature control system 400. This physical and logical coupling enables the temperature control system 400 to communicate with and, in some instances, power or control the operation of one or more components. For example, the communication network interface 406 may be coupled to a communication device that is powered and/or controlled by the processor 402 through the communication network interface 406.

According to various examples, the hardware and software components of the communication network interface 406, actuator(s) 408, and temperature sensor(s) 412 implement a variety of coupling and communication techniques. In some examples, these components use leads, cables or other wired connectors as conduits to exchange data. In other examples, wireless technologies such as radio frequency or infrared technology are used. Software components that may be included in these devices enable the processor 402 to communicate with other components of the temperature control system 400. The software components may include elements such as objects, executable code, and populated data structures. According to at least some examples, where one or more components of the temperature control system 400 communicate using analog signals, the communication network interface 406, actuator(s) 408, and temperature sensor(s) 412 further include components configured to convert analog information into digital information, and vice-versa, to enable the processor 402 to communicate with one or more components of the temperature control system 400.

In some embodiment, the temperature control system 400 includes the communication network interface 406. In these embodiments, the components of the communication network interface 406 couple the processor 402 to one or more communication devices. To ensure data transfer is secure, in some examples, the temperature control system 400 can transmit secure data via the communication network interface 406 using a variety of security measures. In other examples, the network interface 406 includes both a physical interface configured for wireless communication and a physical interface configured for wired communication. In some examples, the temperature control system 400 is configured to exchange temperature or other types of information with an external system via one or more communication devices coupled to the communication network interface 406.

The secondary controller 416 shown in FIG. 2 includes a combination of hardware and software components that allow the temperature control system 400 to communicate with one or more actuators 408 (e.g., actuators 155a, 155b, and 155c discussed above in reference to FIGS. 1 and 2). For example, the secondary controller 416 may generate one or more control signals based on data transmitted from the processor 402 and originating from the primary controller 414, and communicate the control signals to the actuator(s) 408 to adjust the flow rate of air into the control volumes.

Example Temperature Control Process

Figure 12:
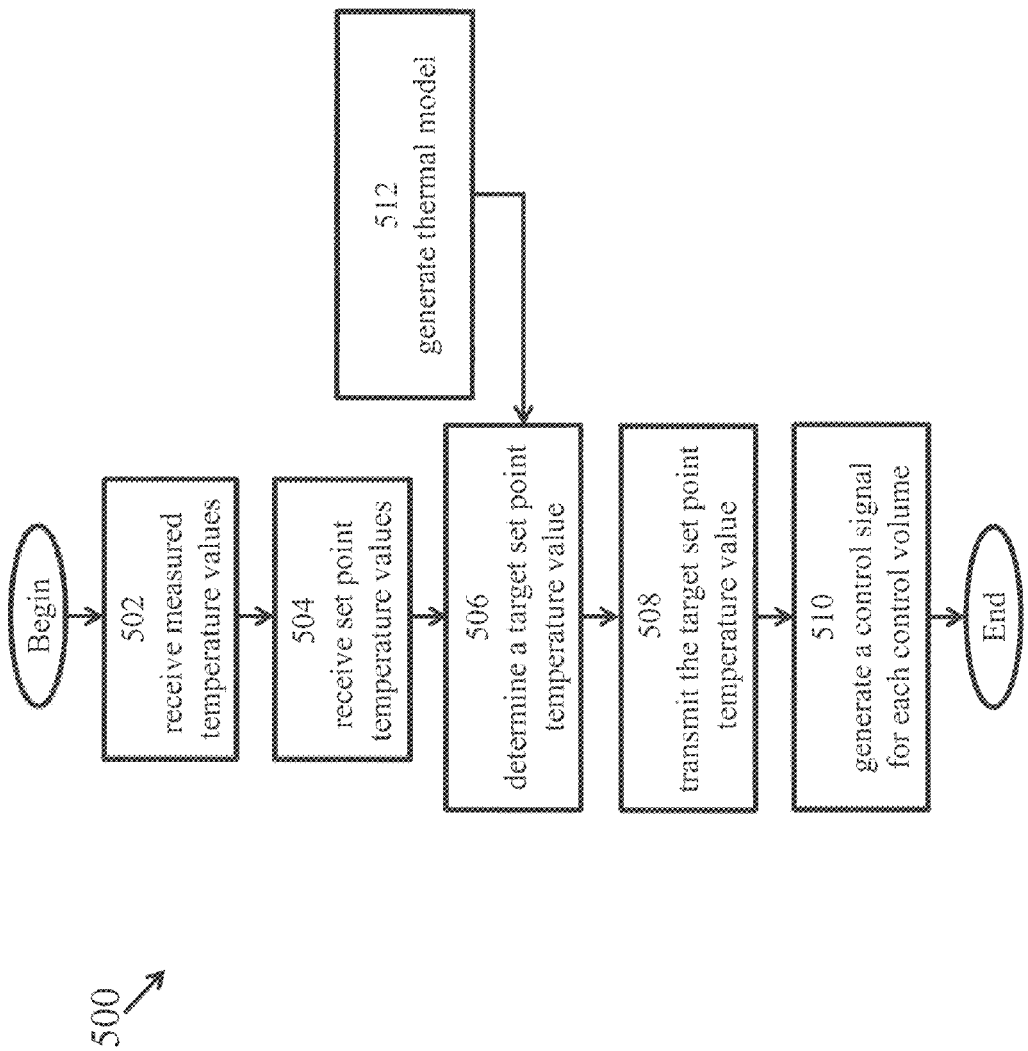
FIG. 12 is a flow diagram of one example of a temperature control process according to aspects of the invention.

FIG. 12 illustrates an embodiment of a temperature control process 500. The temperature control process 500 enables the primary controller and secondary controller(s) to control the temperature of the air within one or more control volumes (e.g., 105a, 105b, and 105c).

In acts 502 and 504, the temperature control system receives measured temperature values from one or more sensors (e.g., sensors150a, 150b, and 150c) and set point temperature values (e.g., 115a, 115b, and 115c), respectively. According to some embodiments, the temperature control system may receive one or both of these values periodically. Further, one or both of these values may be stored, for instance, in a data storage device and then retrieved for use in act 506. In act 506, the temperature control system determines a target set point temperature value for each control volume. For example, the primary controller (e.g., 240) may execute LQR control based on the measured temperature values and the set point temperature values. According to some embodiments, the primary controller is also configured to generate a thermal model, shown as act 512, which may also contribute toward determining the target set point temperature values. As discussed above, the thermal model may be determined from physical data related to the plurality of control volumes, and may include calculations based on conservation of energy using one or more heat transfer terms corresponding to conduction, convection, and radiation. In act 508, the temperature control system transmits the target set point temperature value. For example, the target set point temperature value may be transmitted to the secondary controller (e.g., secondary controllers 130a, 130b, and 130c). In act 510, a control signal is generated for each control volume. For example, the secondary controller may generate a control signal based on the target set point temperature value and the measured temperature value to one or more actuators that are configured to adjust a flow rate of air into each control volume.

It is appreciated that the various stages described above may be combined into any number of stages and additional stages may also be included. For example, in one embodiment, receiving measured temperature values 502 and receiving set point temperature values 504 may be combined into a single stage.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system for controlling each control volume of a plurality of control volumes, the system comprising:
   a plurality of sensors corresponding to the plurality of control volumes, each sensor of the plurality of sensors being configured to:
      detect a temperature value of the control volume corresponding to the sensor; and
      generate a feedback signal for the control volume corresponding to the sensor based on the temperature value;
   a primary controller configured to:
      receive a set point temperature value for each control volume;
      receive the feedback signal for each control volume;
      execute a linear quadratic regulator (LQR) control that is configured to determine a target set point temperature value for each control volume based on the set point temperature value for the control volume, energy utilization, and the feedback signal for the control volume, wherein executing the LQR control includes minimizing an LQR function defined by:

$$J = \int_0^\infty (x(t)^T Q x(t) + u(t)^T R u(t)) dt$$

wherein:
      u(t) represents control signal corresponding to a plurality of secondary controllers;
      x(t) represents a state variable corresponding to temperature;
      Q represents a weight matrix corresponding to the set point temperature; and
      R represents a weight matrix corresponding to the energy utilization; and
   at least one actuator adjusting a flow rate of air into each control volume based on the target set point temperature value for each control volume.

2. The system of claim 1, wherein the primary controller is further configured to generate a thermal model for the plurality of control volumes, the thermal model determined from physical data related to the plurality of control volumes and from at least one calculation based on conservation of energy, wherein the at least one calculation includes at least one heat transfer term corresponding to conduction, convection, and radiation.

3. The system of claim 2, wherein the primary controller is further configured to predict an energy utilization for at least one control volume based on the thermal model.

4. The system of claim 1, wherein executing the LQR control further includes determining a state space model derived from a linear model of the system, the state space model defined by:

$$\frac{dX}{dt} = AX + BU + d(t)$$

wherein:
A represents a state matrix corresponding to temperature;
X represents a vector state corresponding to temperature;
B represents a command matrix; and
U represents a vector input.

5. The system of claim 1, wherein executing the LQR control further includes determining a state space model derived from a non-linear model of the system defined by:

$$\frac{dX}{dt} = AX + g(X, U) + d(t)$$

wherein:
A represents a state matrix corresponding to temperature;
X represents a vector state corresponding to temperature; and
U represents a vector input.

6. The system of claim 1, wherein the plurality of secondary controllers corresponds to the plurality of control volumes and each secondary controller of the plurality of secondary controllers is configured to:
receive the target set point temperature value for the control volume corresponding to the secondary controller;
receive the feedback signal for the control volume corresponding to the secondary controller; and
generate a control signal for the control volume corresponding to the secondary controller based on the target set point temperature value for the control volume corresponding to the secondary controller and the feedback signal for the control volume corresponding to the secondary controller.

7. The system of claim 6, wherein each secondary controller is a proportional-integral-derivative (PID) controller.

8. A method of controlling temperature for each control volume of plurality of control volumes in a system, the method comprising:
receiving a measured temperature value corresponding to each control volume of the plurality of control volumes;
receiving a set point temperature value for each control volume;
determining a target set point temperature value for each control volume by executing a linear quadratic regulator (LQR) control based on the set point temperature value for the control volume, energy utilization, and the measured temperature value for the control volume, wherein executing the LQR control includes minimizing an LQR function defined by:

$$J = \int_0^\infty (x(t)^T Q x(t) + u(t)^T R u(t)) dt$$

wherein:
u(t) represents control signal corresponding to a plurality of secondary controllers;
x(t) represents a state variable corresponding to temperature;
Q represents a weight matrix corresponding to the set point temperature; and
R represents a weight matrix corresponding to the energy utilization;
transmitting the target set point temperature;
generating a control signal for each control volume based on the target set point temperature value for the control volume and the measured temperature value for each control volume; and
adjusting a flow rate of air into each control volume based on a corresponding control signal of the control volume.

9. The method of claim 8, wherein generating the control signal for each control volume is performed by implementing proportional-integral-derivative (PID) control.

10. The method of claim 8, further comprising generating a thermal model for the plurality of control volumes based on physical data related to the plurality of control volumes and from at least one calculation based on conservation of energy, wherein the at least one calculation includes at least one heat transfer term corresponding to conduction, convection, and radiation.

11. The method of claim 10, further comprising predicting an energy utilization for at least one control volume based on the thermal model.

12. The method of claim 8, further comprising:
periodically receiving the measured temperature value for each control volume; and
updating the target set point temperature value based on the periodically received measured temperature value.

13. The method of claim 8, further comprising determining a state space model derived from a linear model of the system, the state space model defined by:

$$\frac{dX}{dt} = AX + BU + d(t)$$

wherein:
A represents a state matrix corresponding to temperature;
X represents a vector state corresponding to temperature;
B represents a command matrix; and
U represents a vector input.

14. The method of claim 8, further comprising determining a state space model derived from a non-linear model of the system defined by:

$$\frac{dX}{dt} = AX + g(X, U) + d(t)$$

wherein:
A represents a state matrix corresponding to temperature;
X represents a vector state corresponding to temperature; and
U represents a vector input.

15. A non-transitory computer readable medium storing instructions executable by at least one processor to execute a temperature control method within a system including a plurality of control volumes, the instructions being coded to instruct the at least one processor to:

receive a measured temperature value for each control volume of the plurality of control volumes;

receive a set point temperature value for each control volume;

determine a target set point temperature value for each control volume by executing a linear quadratic regulator (LQR) control based on the set point temperature value for the control volume, energy utilization, and the measured temperature value for the control volume, wherein executing the LQR control includes minimizing an LQR function defined by:

$$J = \int_0^\infty (x(t)^T Q x(t) + u(t)^T R u(t)) dt$$

wherein:
  u(t) represents control signal corresponding to a plurality of secondary controllers;
  x(t) represents a state variable corresponding to temperature;
  Q represents a weight matrix corresponding to the set point temperature; and
  R represents a weight matrix corresponding to the energy utilization;

transmit the target set point temperature value for each control volume;

generate a control signal for each control volume based on the target set point temperature value for the control volume and the measured temperature value for each control volume; and adjust a flow rate of air into each control volume based on a corresponding control signal of the control volume.

16. The non-transitory computer readable medium of claim 15, wherein the instructions are coded to further include instructions to determine a state space model derived from a linear model of the system, the state space model defined by:

$$\frac{dX}{dt} = AX + BU + d(t)$$

wherein:
  A represents a state matrix corresponding to temperature;
  X represents a vector state corresponding to temperature;
  B represents a command matrix; and
  U represents a vector input.

17. The non-transitory computer readable medium of claim 15, wherein the instructions are coded to further include instructions to determine a state space model derived from a non-linear model of the system defined by:

$$\frac{dX}{dt} = AX + g(X, U) + d(t)$$

wherein:
  A represents a state matrix corresponding to temperature;
  X represents a vector state corresponding to temperature; and
  U represents a vector input.

* * * * *